April 9, 1957    H. F. BREMER    2,788,428
EXPANDING CORE TYPE ELECTRIC WATER HEATER
Filed March 7, 1956    2 Sheets-Sheet 1

INVENTOR
HERMANN F. BREMER
BY
Kenyon & Kenyon
ATTORNEYS

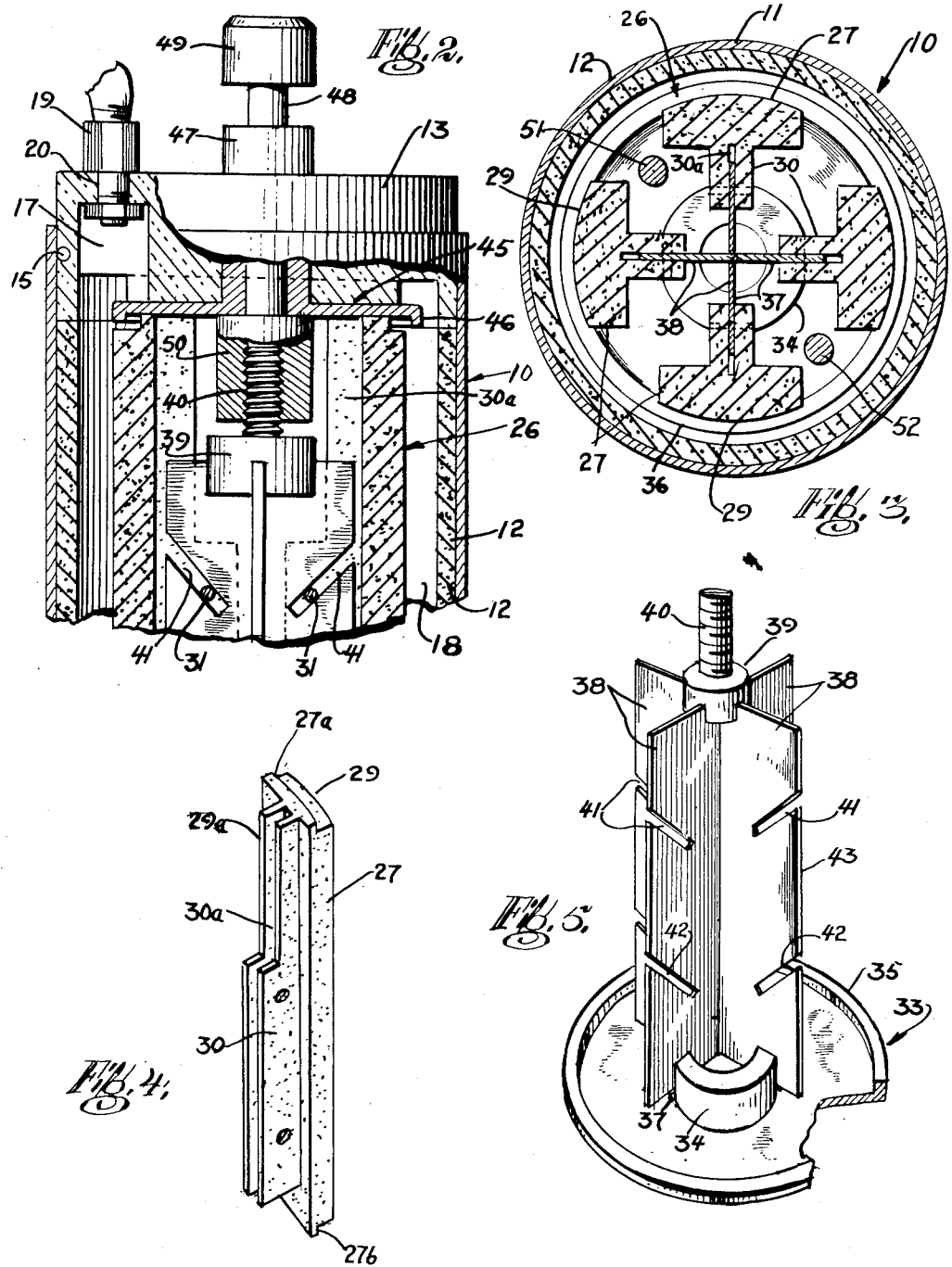

United States Patent Office 2,788,428
Patented Apr. 9, 1957

2,788,428

EXPANDING CORE TYPE ELECTRIC WATER HEATER

Hermann F. Bremer, Mayaguez, Puerto Rico

Application March 7, 1956, Serial No. 571,119

(Filed under Rule 47(b) and 35 U. S. C. 118)

5 Claims. (Cl. 219—40)

This invention relates generally to apparatus for heating of liquids and more particularly to improvements in electrical water heaters.

Electrical water heaters are known wherein heating is effected by conduction of electrical current through the water, the water acting as a resistance. Heaters of this character usually make use of spaced carbon electrodes arranged in opposing relationship and between which the water circulates. It has been found that waters at various localities, by reason of their mineral content possess different electrical resistance characteristics. Consequently, for a given voltage supply, different waters which are to be heated to approximately the same temperature require different adjustments in the spacing or effective area between the electrodes. Such adjustments are difficult to make where the electrodes are fixedly mounted or where the electrode adjustment means is disposed entirely within the body of the heater.

In some types of carbon electric heaters extent arrangements to compensate for variation in the conduction characteristics of the water have been provided by disposing the opposing electrodes in concentric relationship relative to each other and in making one or more of the electrodes rotative about an axis of concentricity relative to the other electrodes to change the spacing between electrodes. While such arrangement is effective for its intended purposes, limitations in the amount of available adjustment exist which prevent the device from being used where the electrical properties of the water vary over a wide range.

Objects and features of the instant invention are the provision of an electric water heater of the character described wherein the available space between the electrodes through which the water to be heated flows may be readily adjusted, the adjusting means being accessible from the exterior of the heater. In the arrangement contemplated by this invention an inner electrode is arranged concentrically within a second or outer electrode. The inner electrode is expansible radially so that its movable components may be expanded and contracted toward and away from the second or outer electrode. The movable components are arranged for actuation by a single member that may be manipulated conveniently from without the heater body. One of the advantages of the apparatus made in accordance with the invention is that a wide range of adjustment is possible to meet widely diverse water and temperature conditions.

Still a further object of the invention is to provide a simple and effective structure with a minimum of mechanical parts necessary for effective operation.

Further objects and features of the invention are to provide an expansible core type electric water heater that is simple and quick to adjust, to operate with waters of widely varying electrical properties to secure similar heating of all such waters.

Other objects and features of the invention will become apparent from the following specification and the accompanying drawings wherein:

Figure 2 is a fragmentary view similar to that of Figure 1 illustrating the expansible core type inner electrode in another of its positions of use;

Figure 3 is a transverse sectional view taken in the plane 3—3 of Figure 1 and viewed in direction of the arrows;

Figure 4 is a perspective view of one of the electrode components of the expansible electrode; and Figure 5 is a perspective view of the expansion adjustment means.

Figure 1:
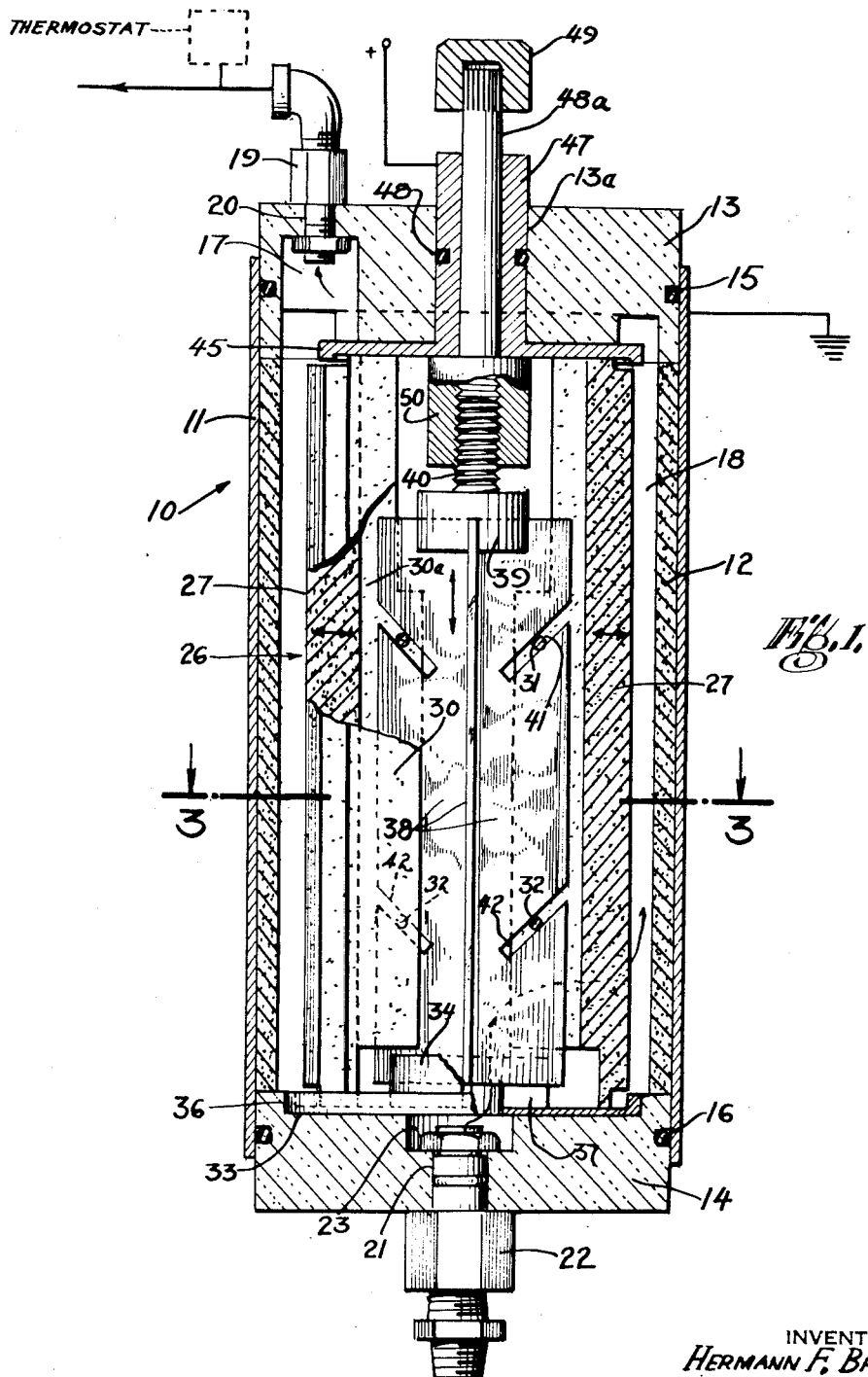
Figure 1 is a vertical section of an electrical heating apparatus made in accordance with the present invention and illustrating the expansible core type inner electrode in one of its operative positions relative to its surrounding outer electrode.

Referring now to the drawings, the electrical heating apparatus 10 made in accordance with the invention comprises a water heating chamber formed, for example, by an open-ended outer hollow casing 11 made preferably of a suitable metal, such as copper and lined with a cylindrical inner shell 12 made preferably of graphite or carbon. This shell 12 in the embodiment shown is cylindrical in shape and constitutes one of the heating electrodes. The ends of the shell 12 and of the casing 11 are closed off by end closures or insulating disks 13 and 14 formed of appropriate insulating material such as "Bakelite" or of a ceramic composition. Conventional O sealing rings 15 and 16 of rubber or other sealing composition are provided to hermetically seal the end closures relative to the ends of the shell 11. The upper end closure disc 13 is provided with a chambered recess 17 which communicates with the internal chamber 18 defined by the shell 12. An outlet nipple 19 is appropriately mounted through an opening 20 that communicates with the recess 17 so that fluid passing from the chamber 18 into recess 17 may be delivered from the heater assembly 10.

The other end closure 14 at the opposite end of the heater assembly 10 is provided with an access opening 21 in which an inlet nipple 22 is appropriately mounted and into which nipple water or other fluid to be heated may be delivered from a conventional water main. The inlet nipple 22 terminates internally of the opening 21 within a chamber 23 which communicates with the internal chamber 18 of the heater assembly.

The heater assembly including its end closure members 13 and 14 is rigidly held together, for example, by tie rods (not shown) or other conventional clamping means.

The inner electrode 26 is positioned internally of the electrode 12. This internal electrode 26 is of an expanding core type and is disposed coaxially with the outer electrode 12. The inner electrode 26 comprises a group of identical movable components 27 preferably of carbon. These components 27 are adapted to be movable as a group for expansion and contraction radially toward and away from the inner surface of the outer electrode 12 and their relative distance from said surface determines the extent of electric current flow between the electrodes 12 and 26 when electrical potential is applied therebetween.

In the embodiment shown there are four movable electrode components 27 of identical shape seen best in Figures 3 and 4. Each component 27 is preferably of carbon or graphite and is substantially the length of the electrode 12. Each is provided with a curved surface 29 whose curvature is complemental to that of the curvature of the inner surface of electrode 12. Rearward by extending projections 30 are provided for the components 27 and a longitudinally extending groove 30a is provided in each of the projections 30. A pair of transversely disposed spaced apart pins 31 and 32 each spanning a groove 30a are provided for purposes presently to be described.

Mounting means are provided for carrying the electrode components 27. In the embodiment shown this mounting means includes a base disk 33 provided with a centrally disposed upstanding tubular boss 34 and an outer upstanding peripheral rim 35. The disk 33 is adapted to rest within a recess 36 provided in the upper face of the lower end closure 14. The upstanding tubular boss 34 has longitudinally disposed slots 37 spaced 90° apart, i. e., arranged at quadrant locations, and extending downwardly from the upper rim of the boss 34. A group of plate members 38 disposed at right angles to each other are adapted at their lower ends to fit guidedly and slidably within the grooves or slots 37. The plate members 38 at their upper ends are permanently fixed to a slotted head 39 of an axially extending threaded bolt member 40 as by soldering or by any other conventional ways. The bolt member 40 extends upwardly and is adapted to extend coaxially with the axis of the tubular shell 12. The plates 38 are thus disposed at right angles to each other at quadrant positions and are guidedly slidable in the axial direction of the shell 12 within the slots 37.

Each of the plate members 38 is provided with a pair of angularly disposed spaced apart slots 41 and 42 extending inwardly and preferably downwardly from the outermost longitudinal edges 43 of the respective plates 38. The spacing between the pair of slots 41 and 42 is the same as the spacing between the camming pins or followers 31 and 32 of the respective electrode elements 27. The latter are adapted to be mounted on the respective plates 38 by insertion of the latter within the grooves 30a with the respective pins 31 and 32 engaging in respective slots 41 and 42.

The respective components 27 have their grooved portions 30 cut away at 29a in their upper ends to provide clearance for the head 39 of the bolt 40, the elements 27 each being longer than the respective carrying plates 38. A disk-like member 45 is positioned to overlie the upper ends of the components 27. This disk-like member 45 has a downwardly extending peripheral rim 46 and an upwardly extending tubular bearing 47 which projects through a centrally disposed opening 13a within the upper end closure 13. Appropriate sealing means 48 provides a seal between the end closure and the tubular bearing 47. A rotatable shaft 48a is carried within the tubular bearing 47 and is provided at its outer end with a manipulating knob 49 and at its inner end with a threaded nut 50 which is adapted to threadedly engage the bolt 40 so that rotation of the knob 49 and of the shaft 48a will cause axial displacement of the bolt 40 and the plates 38 carried by the head 39 of the bolt 40.

A pair of tie rods 51 and 52 extend axially between the disks 33 and 45 and are engageable therewith by means of screw bolts (not shown) extending through the respective disks 33 and 45 for the purposes of maintaining the components 27 in assembled relationship between the disks 33 and 45 and further for the purposes of preventing axial displacement of the electrode components 27. Because of this factor axial or longitudinal displacement of the bolt 40 and of the plates 38 resulting from rotation of the manipulating knob 49 causes the camming slots 41 and 42 of the respective plates 38 to act against the respective camming pins 31 and 32 and thereby to effect radial movement of the respective electrode components 27 toward and away from the internal complemental surface of the outer electrode 12. The opposite ends of the electrode components 27 are recessed at 27a and 27b for engagement with the respective peripheral rims 35 and 46 of the respective disks 33 and 45. This arrangement definitely limits the outward expansion of the electrode components 27 to prevent their physical contact with the inner surface of the outer electrode 12.

With the arrangement described electric potential is applied between the electrodes 12 and the movable electrode components 27 in any convenient electrical circuit. With knowledge of the electrical properties of the water to be heated, the spacing between the electrode components 27 and the inner surface of the electrode 12 is adjusted by manipulation of the knob 49 in required direction of rotation causing appropriate radially directed expansion or retraction of the electrode components 26. The spacing between the electrode components 27 and the inner surface of the electrode 12 is thus adjusted to provide for the desired heating effect on the water entering at the nipple 22 and passing through the chamber 18 between the spaces provided between the electrode components 27 and the inner wall of the electrode 12. The heated water thereafter enters chamber 17 and passes outwardly of the heating device via the outlet nipple 19. If the electrical characteristics of the water change, necessary expansion or contraction of the inner core electrode 26 by manipulation of the knob 49 in required direction of rotation is effected to meet the new conditions. Because the inner core electrode 26 is radially expansible and contractible the change in spacing between its components 27 and the inner surface of the outer electrode 12 provides convenient adjustability over a wide range to accommodate a wide variance in waters capable of being heated effectively by the heater of this invention. Moreover, the simple external manipulation knob 49 provides a convenient and safe as well as ready means of adjusting the expansible core electrode 26 and its components 27 for differing water conditions in a rapid manner without the necessity of using tools or of dismantling the heater. It is understood, of course, that the heater may be utilized in conjunction with thermostatic control devices and water flow control devices of conventional kinds to provide safety of operation and to provide needed electric cutoff to prevent both undesired heating when water is not flowing and excessive temperature rises during heating. These control elements and their manner of connection in the electric circuit, however, are conventional and form no part of the instant invention.

While a specific embodiment of the invention has been disclosed variations in structural detail are possible and are contemplated. There is no intention therefore of limitation to the exact details shown and described.

What is claimed is:

1. An electric water heater comprising an expansible electrode, a hollow electrode surrounding the expansible electrode and means for expanding and contracting the expansible electrode to change the spacing between it and said hollow electrode.

2. An electric water heater comprising an expansible electrode, a hollow electrode surrounding the expansible electrode, and means for expanding and contracting said expansible electrode toward and away from said hollow electrode to vary the spacing between the electrodes, said means including a rotatable member extending outwardly of said heater and cam means internally of said heater operable by manipulation of said rotatable member.

3. An electric water heater comprising a hollow electrode, an expansible core type electrode supported internally of said hollow electrode, said expansible core type electrode including separate components, means for supporting the said separate components in radially movable manner, camming means for moving said separate components radially toward and away from said hollow electrode and manipulating means positioned externally of said heater for operating said camming means.

4. The device of claim 3 wherein said camming means includes plates having angularly disposed camming slots, said separate components being supported individually from different of said plates and having camming pins engageable in said camming slots and means to prevent longitudinal displacement of said components.

5. An electric water heater comprising a hollow electrode, an expansible core type electrode within said hollow electrode, said core type electrode including separate components each having a surface complemental in shape to that of the inner surface of said hollow electrode and having longitudinal slots, supporting plates engageable each with one of the slots for mounting the respective components, said plates having camming slots, and said components having camming followers engageable in said slots, a threaded member secured to said plates, a second threaded member engageable with the first-named threaded member, manipulating means for rotating said second threaded member and located externally of said heater, and means for preventing axial movement of said components during rotation of said second threaded member whereby radial displacement of said components in expansion and retraction relative to said hollow electrode will be effected in accord with the direction of rotation imparted to said second threaded member.

References Cited in the file of this patent

UNITED STATES PATENTS 2,572,337    Harris _____ Oct. 23, 1951